No. 635,038. Patented Oct. 17, 1899.
C. E. ELY.
FIRE ESCAPE AND SCAFFOLD HOLDER.
(Application filed Apr. 17, 1899.)
(No Model.)
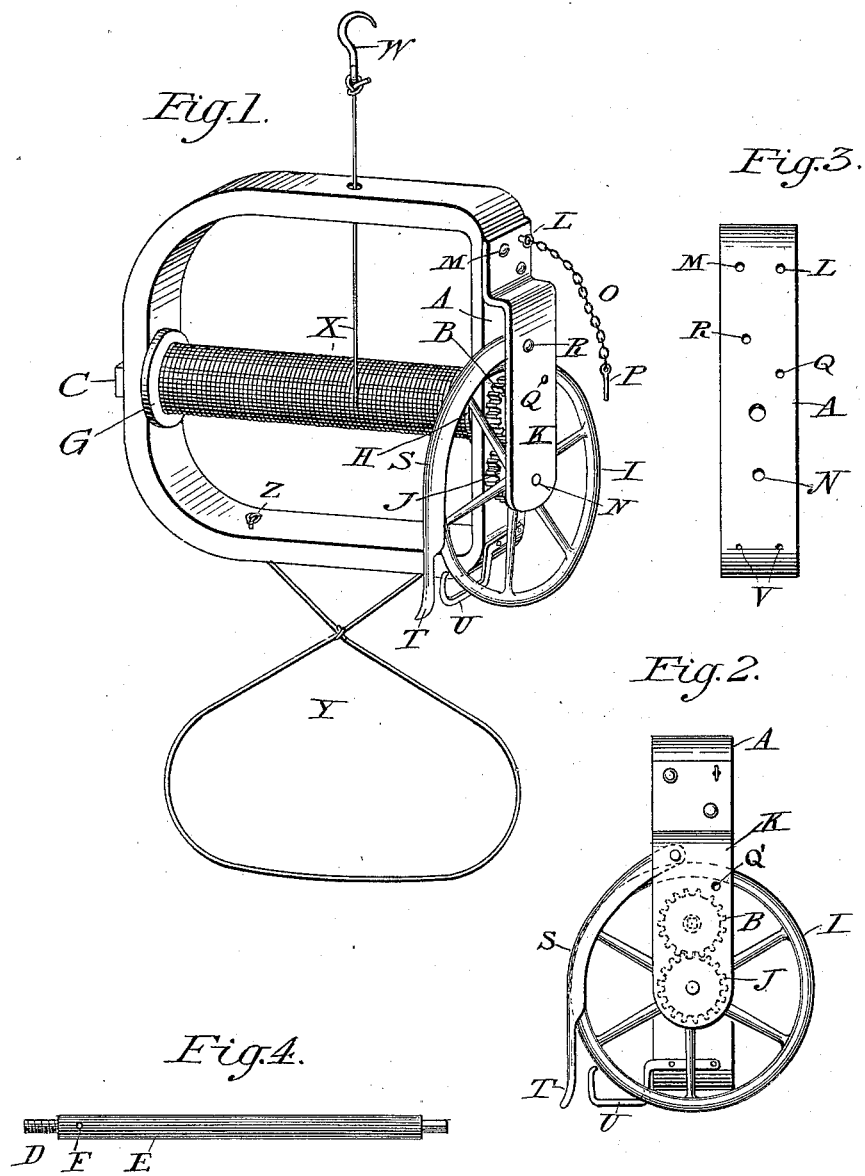
Witnesses:
W. L. Davisson
A. B. Ely
Inventor:
Charles E. Ely

UNITED STATES PATENT OFFICE.

CHARLES E. ELY, OF PEEBLES, OHIO.

FIRE-ESCAPE AND SCAFFOLD-HOLDER.

SPECIFICATION forming part of Letters Patent No. 635,038, dated October 17, 1899.

Application filed April 17, 1899. Serial No. 713,430. (No model.)

*To all whom it may concern:*

Be it known that I, CHARLES E. ELY, a citizen of the United States, residing at Peebles, in the county of Adams and State of Ohio, have invented a new and useful Fire-Escape and Scaffold-Holder, but which, when made larger and stronger, can be successfully used in bridge-building for raising and lowering heavy timbers and irons, and the fire-escape can be used with safety in descending from a balloon, of which the following is a specification.

The object is with ease and safety to accomplish the purposes above mentioned. I attain these objects by the mechanism illustrated in the accompanying drawings, in which the figures represent the separate views and the letters refer to the separate parts.

Figure 1 is a perspective view of the entire machine. Fig. 2 is the shaft or axle. Fig. 3 is an end view of the frame in which the shaft or axle turns and upon which the wheels are stationed. Fig. 4 is an end view of the wheels, showing the position of the cog-wheels in gear and the hand or brake wheel I.

The frame A is to be made of any of the following materials: malleable iron, brass, steel, or aluminium, and may be either flat, round, half-round, hollow tubing, or ribbed. This frame is to be almost round, except on one side, which is to be a straight face, upon which the wheels are mounted, and may be made any size suitable for the purpose for which it is used.

B is the solid cog-wheel, which contains a square hole in the center, which fits upon a square on the end of the shaft E, where it is riveted. This wheel is to be the same size as the cog-wheel in the center of the hand-wheel and enough larger than the axle to give the required strength.

C is the nut, which fits upon the thread D on the left-hand end of the shaft. This is to prevent the shaft and cog-wheel from getting out of place. This cog-wheel B works between the hand-wheel and the end of frame A.

E is the shaft, which is to be made of steel or iron and is to be round and smooth, except the ends, and will contain three holes F, in which to tie the rope or wire and in which to rivet the flanges near the ends. G and H are the flanges, which fit upon the shaft at the ends inside of the frame. They have a small bearing or rim on the outside of the flange where they would touch the frame, and they will be kept in place by rivet through the rim of the flange and through the shaft. These flanges are to prevent the rope from cutting on the frame and to keep the rope in position. They are placed upon the shaft as it is being set in the frame.

I is the hand-wheel, carrying integral therewith cog-wheel J and can be of any size proportionate to the frame. The surface of the wheel is to be smooth, so as not to hurt the hand in regulating the speed while being used as a fire-escape, &c.

J is formed as a cog-rim or solid wheel molded upon the spokes of the hand-wheel I and is to be the same size as the cog-wheel B. These wheels prevent the slipping and the instantaneous fall when the brake is slackened to descend.

K is a flat iron stay bent or cast so as to bolt upon frame A at points L M N.

O and P are the chain and pin. The chain O is attached to frame at the bolt L. The pin P is to be used for a stationary lock for scaffolds and to lock with while the machine is being drawn up for further use after a descent has been made. This pin passes through a hole in the stay K at Q' and through the hand-wheel I on into a hole in frame A at Q.

Several persons can escape from a fire by the use of one machine, as when drawn up a hitch of rope may be taken around the anchor-hook close to the machine to save winding up.

S represents the circumferential brake, which is to be half-round and hollow except at the handhold. This brake fits upon the circumference of the rim of the wheel I. It is attached to stay K and frame A at points R. It is used by gripping the handle T of the brake and the arm U together.

U, the stay-arm, is bolted upon frame A at points V. This arm can be removed with the brake when the machine is being used for other purposes than that of a fire-escape.

W is the hook with which to fasten the fire-escape rope to the window-frame or any other anchorage.

X is the rope or cable, of a size proportionally to the use.

Y, the hoop-rope, is used by the operator of the machine or for the support of scaffolding and is attached to frame A at points Z, &c. This rope can also be used while lowering timbers or irons to attach the machine to the trestle or bridge, letting the timbers or irons down upon the hook end W.

By handling the wheel I you can move immense weights.

This machine is wound up by running the hand-wheel I the reverse of the way you want it to unwind when running down.

This fire-escape and scaffold-holder is to be finished in any way desirable.

Very slight changes, which are considered mechanical, shall come within the sphere of my claim.

I claim—

In a fire-escape and scaffold-holder the combination of a nearly-rectangular frame having an opening in the top, and one flat end provided with a seat for a locking-pin, a stay having an opening registering with the seat in the frame, a shaft, a flange mounted upon the shaft near each end, a cog-wheel mounted upon one end of the shaft, a cable wound upon the shaft, a hook upon the end of the cable, a sling fastened to the bottom of the frame a circumferential brake, an arm U fixed upon the frame, a hand-wheel, and a cog-wheel integral with the hand-wheel, substantially as shown and described.

CHARLES E. ELY.

Witnesses:
W. L. DAVISSON,
A. B. ELY.